United States Patent [19]
Lau et al.

[11] Patent Number: 5,273,309
[45] Date of Patent: Dec. 28, 1993

[54] AIR BAG FOR SIDE IMPACT

[75] Inventors: Ian V. Lau, Troy; Jeffrey A. Welch, St. Clair Shores; Larry G. La Grange, Romeo; Brian H. Frantz, Royal Oak, all of Mich.

[73] Assignee: General Motors Corporation, Detroit, Mich.

[21] Appl. No.: 901,300

[22] Filed: Jun. 19, 1992

[51] Int. Cl.$^5$ ............................................. B60R 21/22
[52] U.S. Cl. .................................................. 280/730 A
[58] Field of Search .............. 280/728, 730, 733, 743, 280/728 R, 728 A, 728 B, 730 R, 730 A, 743 R

[56] References Cited

U.S. PATENT DOCUMENTS

| | | | |
|---|---|---|---|
| 2,834,606 | 5/1958 | Bertrand | 280/730 |
| 3,510,150 | 5/1970 | Wilfert | 280/733 |
| 3,617,073 | 11/1971 | Landsman et al. | 280/150 |

FOREIGN PATENT DOCUMENTS

| | | | |
|---|---|---|---|
| 2041741 | 2/1972 | Fed. Rep. of Germany | 280/730 A |
| 0258636 | 11/1991 | Japan | 280/730 A |
| 0166451 | 6/1992 | Japan | 280/730 A |

*Primary Examiner*—Margaret A. Focarino
*Assistant Examiner*—Paul Dickson
*Attorney, Agent, or Firm*—Charles E. Leahy

[57] ABSTRACT

The air bag assembly, including the inflator and the stored air bag are mounted on the vehicle pillar adjacent the front seat back. Upon deployment, the air bag unfurls from a housing mounted on the pillar and extends along the door between the end of the seat and the door. The air bag assembly can include either an air bag which unfurls forwardly for the front seat occupant, or which unfurls rearwardly for the rear seat occupant, or air bags for both the front and rear occupants. The air bags maybe inflated by a single inflator, or separate inflators may be provided for the front and the rear seats. A sensor may be mounted on either the door or the pillar to provide an input signal to the air bag actuating electrical circuit.

3 Claims, 3 Drawing Sheets

AIR BAG FOR SIDE IMPACT

The invention relates to a vehicle air bag and more particularly an air bag mounted on the pillar to which the door is latched and having an air bag which deploys into the space between the seated occupant and the door.

BACKGROUND OF THE INVENTION

It is well known in motor vehicles to provide an air bag deployed by a gas generator to cushion an occupant.

The prior art has recognized that such an air bag may be mounted on a vehicle door to provide such cushioning in a side impact situation.

It would be desirable to provide a side air bag without necessitating the direct mounting of the air bag on the vehicle door where interference may result with door handles, window handles, and arm rests.

SUMMARY OF THE INVENTION

According to the present invention, the air bag assembly, including the inflator housing and the stored air bag are mounted on the vehicle pillar adjacent the front seat back. Upon deployment, the air bag unfurls from the housing mounted on the pillar and extends along the door between the end of the seat and the door. The air bag assembly may include an air bag for the front seat, an air bag for the rear seat, or air bags for both the front and rear seats. The front and rear air bags maybe inflated by a single inflator or separate inflators may be provided for the front and the rear seats. A sensor may be mounted on either the door or the pillar to provide an input signal to the air bag actuating electronic control circuit.

DESCRIPTION OF THE PREFERRED EMBODIMENT

Figure 1:
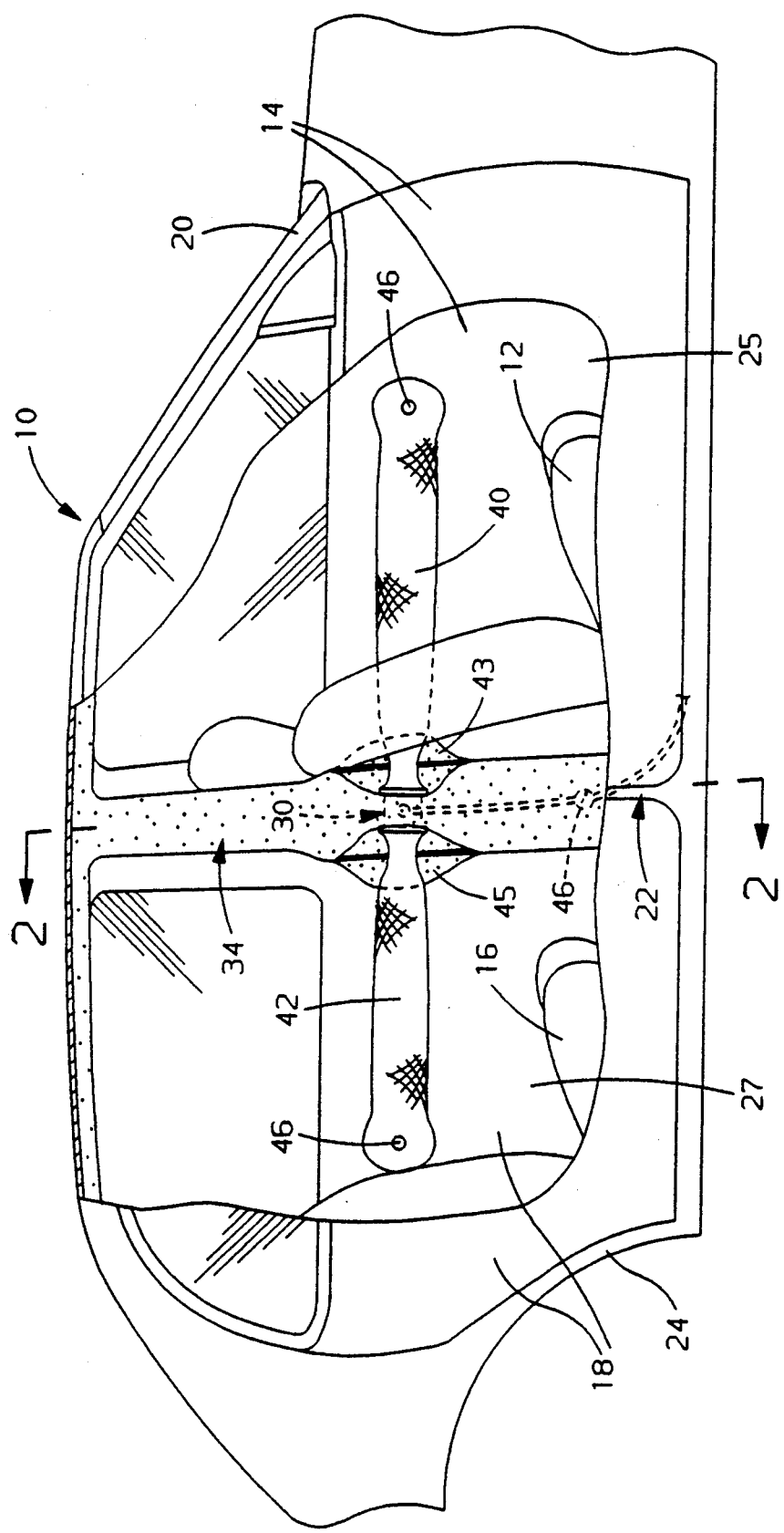
FIG. 1 is a side elevation view of a vehicle according to the invention and having the front and rear doors partially broken away to show the front and rear seat air bags in the deployed condition.

Referring to FIG. 1 it is seen that a conventional motor vehicle 10 includes a front seat 12 accessible through a front door 14, and a rear seat 16 accessible through a rear door 18. The front door 14 is conventionally hinged on a front pillar 20 of the vehicle and latched to a second pillar 22 of the vehicle. The rear door 18 is hingedly mounted on the second pillar 22 and is latched to the rearmost pillar 24 of the vehicle body. The front door 14 carries a side panel 25 located adjacent the front seats 12 and the rear door 18 carries a side panel 27 located adjacent the rear sear 16.

Figure 2:
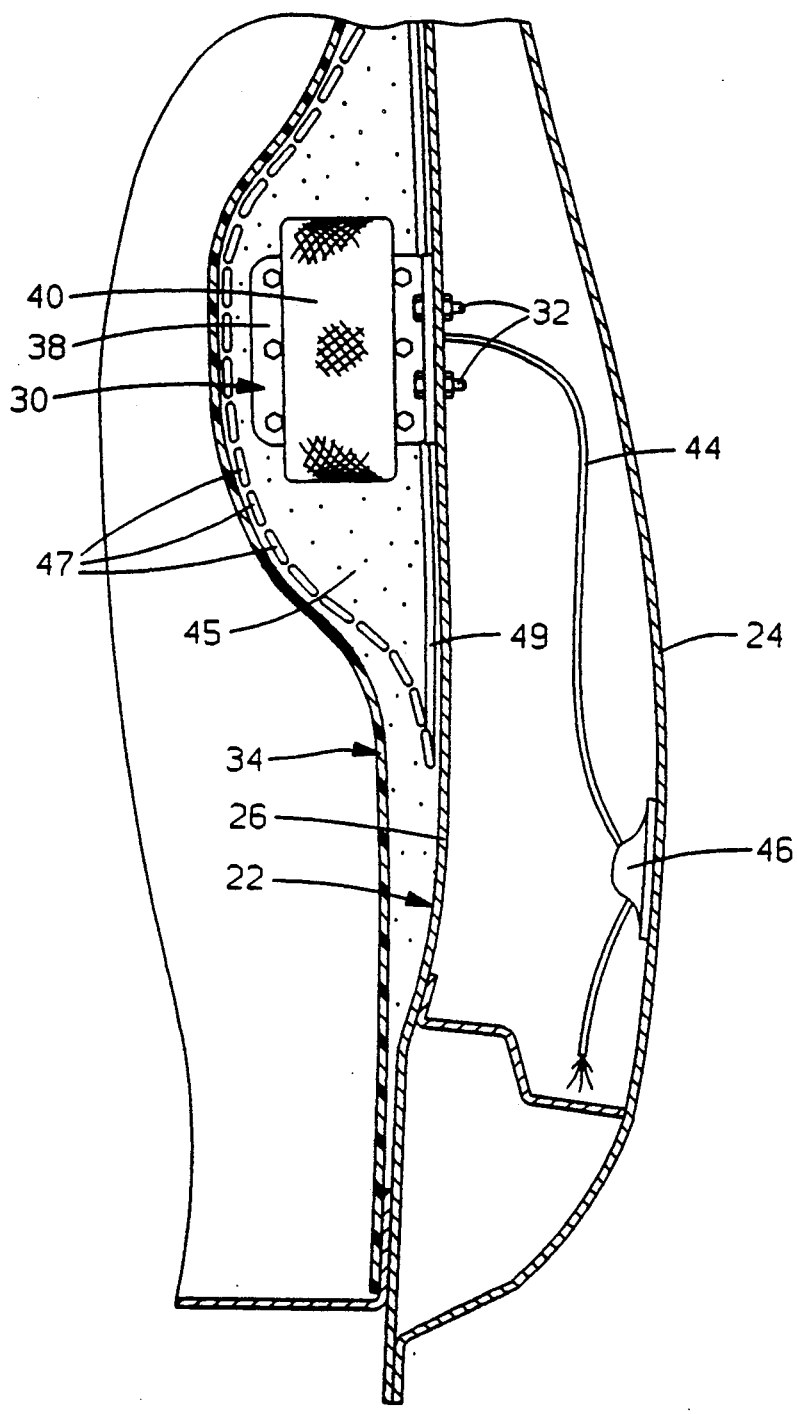
FIG. 2 is a section view taken in the direction of arrows 2—2 of FIG. 1 showing the mounting of the air bag assembly on the pillar.

As best seen in FIGS. 1 and 2, the pillar 22 is comprised of an outer panel 24 and an inner panel 26 which are suitably welded or otherwise connected together in spaced apart relation. The outer panel 24 may be an outside panel of the motor vehicle body, or may alternatively be concealed behind the edges of the doors 14 and 18.

Figure 3:
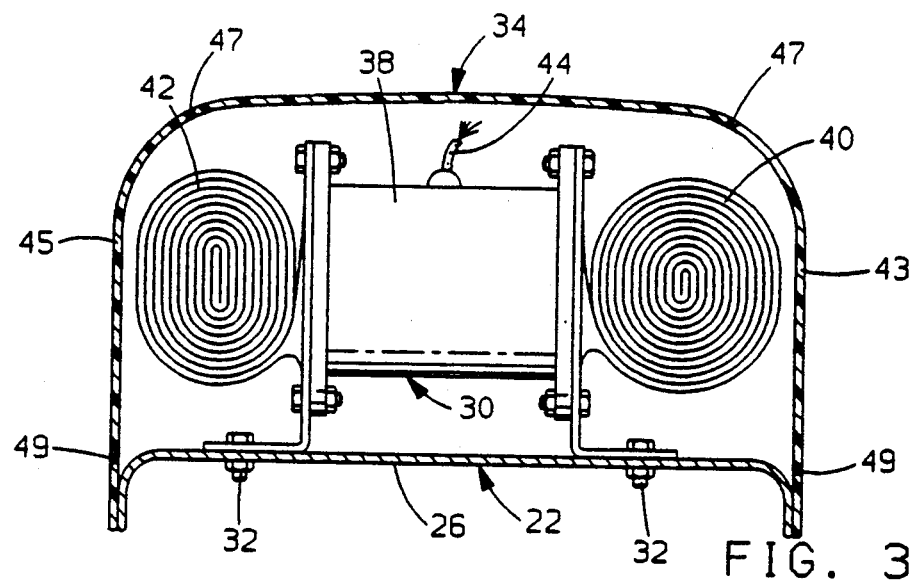
FIG. 3 is an engaged plan view of a typical inflator having front and rear seat air bags shown in the stored condition and a single inflator for inflating both the air bags.

As seen in FIGS. 2 and 3, an air bag assembly 30 is mounted on the inner panel 26 by nut and bolt assemblies 32. The pillar 22 and air bag assembly 30 are concealed by plastic molding 34.

FIG. 3 shows a typical air bag assembly 30 which includes an inflator 38, front seat air bag 40 and a rear seat air bag 42. The air bags 40 and 42 are rolled to a stored condition and respectively concealed behind break away doors 43 and 45 of the plastic molding which conceals the air bag from view. The doors 43 and 45 are molded integrally into the plastic molding and defined by a series of weakening indentations 47 molded into the plastic molding 34 to promote tearing of the plastic and a hinge indentation 49 which enables the doors to hinge open. A control wire 44 is connected to the inflator 38 and extends to suitable electronic control circuitry for initiating the actuation of the air bag. The electronic control circuitry preferably includes a sensor 46 shown in FIG. 2 mounted on the pillar 22.

Figure 4:
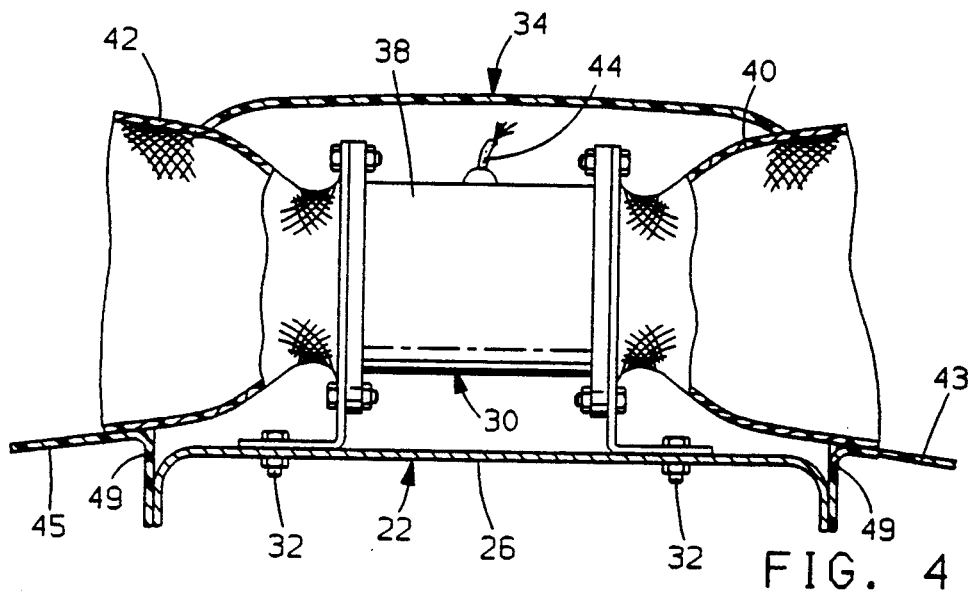
FIG. 4 is a view similar to FIG. 3 but showing the air bags inflated.

Referring to FIGS. 1 and 4, it is seen that the actuation of the air bag assembly 30 by the electronic control circuitry will cause the inflator 38 to generator inflation gas which unfurls the front occupant bag 40 and the rear occupant bag 42 to their deployed positions of FIG. 1 in which the air bags extend between the seated occupants and the adjacent vehicle door. Each air bag 40 and 42 has a vent hole 46 at the end thereof to control the pressure within the bag.

Figure 5:
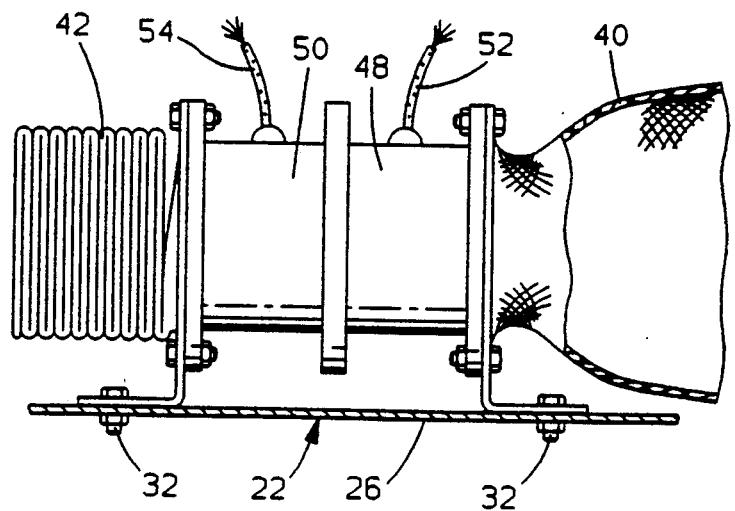
FIG. 5 is a elevation view of the air bag assembly having separate inflators for the front and rear air bags showing one air bag stored and the other inflated.

FIG. 5 shows an alternative arrangement of the air bag assembly in which the front air bag 40 has an inflator 48 with control wire 52 and the rear air bag 42 has a separate inflator 50 with a control wire 54. The control wires 52 and 54 are preferably connected with separate electronic control circuitry which will actuate the front air bag 40 if an occupant is seated in the front seat 12 and separately actuates the rear seat bag 42 if an occupant is present on the rear seat 16.

It will be understood that although FIG. 1 shows a air bag of relatively long narrow shape, other air bag shapes may be employed within the ordinary skill of the art in order to obtain the desired results.

Although the vehicle of FIG. 1 is shown as a four-door vehicle having front and rear doors, it will be understood that the invention is equally applicable to a coupe vehicle having only front doors, and in which case the pillar mounted air bag for the rear seat will deploy along the side panel of the vehicle body. It will also be appreciated that although the air bag shown in the drawings includes both a front occupant air bag and a rear occupant air bag, the pillar mounted air bag assembly can include only one air bag.

In the preferred embodiment of FIG. 1 the air bag assembly is mounted on the pillar at an elevation just vertically below the side windows. However, it is understood that the air bag assembly may be mounted higher or lower as desired. Thus it is seen that the invention provides a new and improved side impact air bag for a motor vehicle in which the air bag assembly is mounted on the pillar between the front and rear seats.

The embodiments of the invention in which an exclusive property or privilege is claimed are defined as follows:

1. In combination, a motor vehicle having a passenger compartment accessible through front and rear doors, a first pillar to which a front door is hingedly mounted, a second pillar located rearward of the first pillar and to which the front door is latched in a closed position and to which the rear door is hingedly mounted, said second pillar being provided with inner and outer panels, an occupant front seat adjacent the front door and an occupant rear seat adjacent the rear door, an air bag assembly including an inflator mounted on the inner panel of the second pillar for inflating a first air bag facing forward and a second air bag facing rearward, a plastic molding mounted on the inner panel of the second pillar to conceal the air bag assembly and having a first door facing forward and a second door facing rearward, said inflator being actuable to unfurl the first air bag to an inflated position extending through the front door between the front seat occupant and the front door, as permitted by opening of the first door of the plastic molding and unfurl the second air bag to an inflated position extending along the rear door between the rear seat occupant and the rear door as permitted by opening of the second door of the plastic molding.

2. The combination of claim 1 further characterized by the first air bag and the second air bag being inflatable by a common gas generator.

3. The combination of claim 1 further characterized by the first air bag and the second air bag having separate gas generators so that either the first air bag or the second air bag may be actuated independently of the other.

* * * * *